United States Patent [19]

Stewart et al.

[11] Patent Number: 5,593,550

[45] Date of Patent: Jan. 14, 1997

[54] PLASMA PROCESS FOR REDUCING FRICTION WITHIN THE LUMEN OF POLYMERIC TUBING

[75] Inventors: Mark T. Stewart, Brooklyn Center; Mary M. Morris, Mounds View; Edward Di Domenico, Anoka; Kenneth W. Keeney, Forest Lake, all of Minn.

[73] Assignee: Medtronic, Inc., Minneapolis, Minn.

[21] Appl. No.: 239,007

[22] Filed: May 6, 1994

[51] Int. Cl.[6] .............................. H05H 1/24; B29C 59/14
[52] U.S. Cl. .......................................... 204/165; 204/164
[58] Field of Search ....................................... 204/165, 164

[56] References Cited

U.S. PATENT DOCUMENTS

| 4,261,806 | 4/1981 | Asai et al. | 204/165 |
|---|---|---|---|
| 4,432,377 | 2/1984 | Dickhudt | 128/786 |
| 4,488,954 | 12/1984 | Hatada | 204/169 |
| 4,576,174 | 3/1986 | Miyazaki et al. | 128/239 |
| 4,692,347 | 9/1987 | Yasuda | 427/40 |
| 4,718,907 | 1/1988 | Karwoski | 623/12 |
| 4,752,426 | 6/1988 | Cho | 264/22 |
| 4,846,101 | 7/1989 | Montgomery | 118/723 |
| 4,927,676 | 5/1990 | Williams | 428/36 |
| 4,948,628 | 8/1990 | Montgomery | 427/39 |
| 4,976,720 | 12/1990 | Machold et al. | 606/194 |
| 5,133,422 | 7/1992 | Coury | 128/784 |
| 5,133,986 | 7/1992 | Blum | 427/39 |
| 5,198,033 | 3/1993 | Kelley | 118/718 |
| 5,223,308 | 6/1993 | Doehler | 427/575 |
| 5,244,654 | 9/1993 | Narayanan | 427/2 |
| 5,308,319 | 5/1994 | Ide et al. | 600/18 |

FOREIGN PATENT DOCUMENTS

| 0089124 | 9/1983 | European Pat. Off. . |
| 2009359 | 6/1979 | United Kingdom . |
| 9109722 | 7/1991 | WIPO . |
| 9305842 | 4/1993 | WIPO . |
| 9406495 | 3/1994 | WIPO . |

OTHER PUBLICATIONS

Plasma Polymerization and Plazma Treatment, Jnl. of Applied Polymer Science: Applied Polymer Symposium 38 an Interscience Publication, "Semicontinuous Plasma Polymerization Coating Onto the Inside Surface of Plastic Tubing" by Matsuzawa and Yasuda, pp. 65–74, 1984 (no month available).

*Primary Examiner*—Kathryn Gorgos
*Assistant Examiner*—Kishor Mayekar
*Attorney, Agent, or Firm*—Daniel W. Latham; Harold R. Patton

[57] ABSTRACT

This invention relates to the preferential glow discharge at the inside diameter (ID) of plastic tubing, particularly very small tubing.

34 Claims, 5 Drawing Sheets

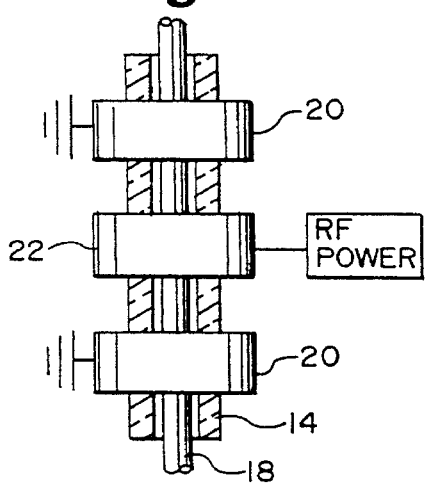
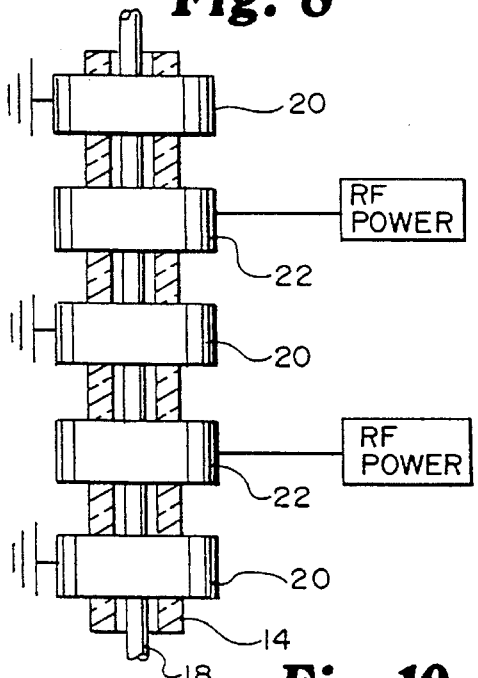
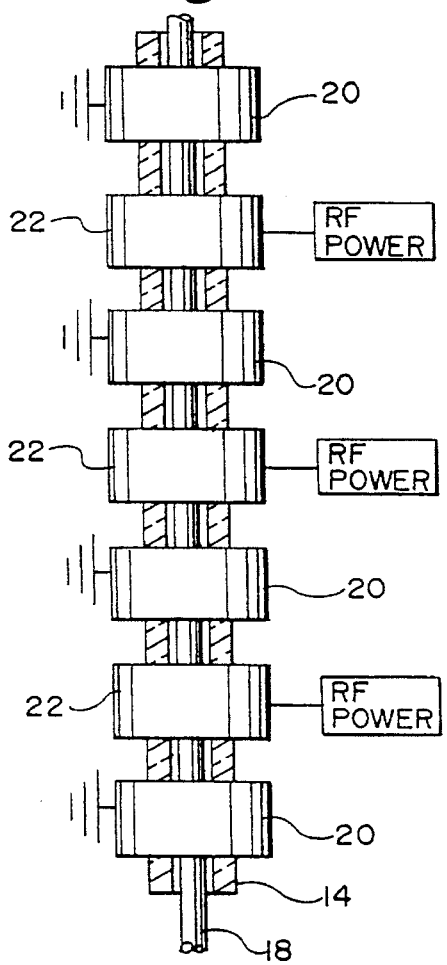
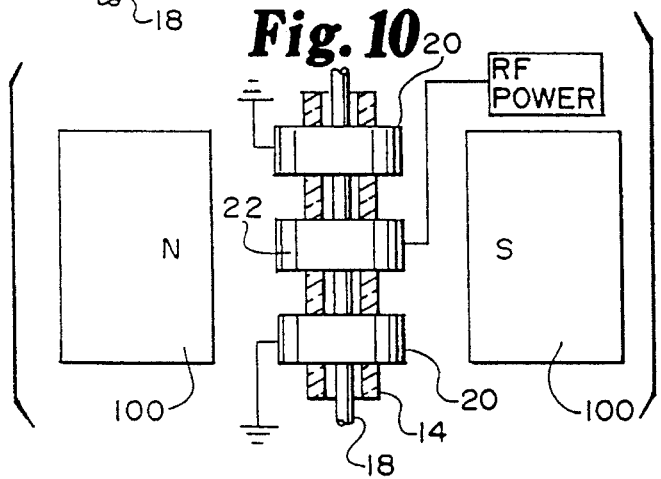
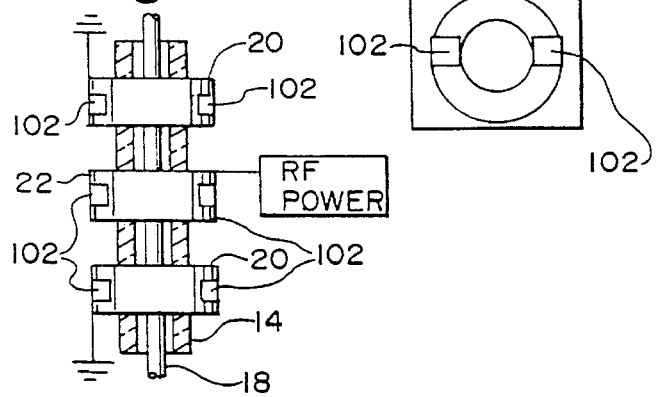

PLASMA PROCESS FOR REDUCING FRICTION WITHIN THE LUMEN OF POLYMERIC TUBING

BACKGROUND OF THE INVENTION

This invention relates to surface modification of the slip characteristics of the inside diameter (ID) surface of tubing composed of polymeric materials such a silicone rubber, polypropylene, polyethylene, polyvinylchloride, fluoropolymers and the like or other dielectric materials and to improved methods and apparatus for effecting such modifications.

Polymeric plastic tubing, particularly that of small diameter, and most especially that of silicone rubber, is used in many medical applications and devices. Actually, silicone rubber (especially peroxide cross linked silicone elastomer with silica filling) is the polymer of choice for tubing in many medical applications involving implantation. In may instances this tubing is less than about 2 mm in ID.

Although this invention is applicable to other polymeric materials and dielectric materials, it will be described herein with particular reference to silicone rubber, the preferred embodiment. For example, the so called "screw-in" pacing leads make use of very small diameter tubing such as less than 0.055 inch (OD) with an ID of 0.035 inch. In this type of lead, an elongate wire core (usually in the form of a coil) having a helical screw-in electrode at its distal end is placed inside an elongate silicone, tube to provide a catheter-like device. The core wire is manipulated at the proximal end of this arrangement by the physician during implantation to screw the helical electrode into heart tissue and fix the lead in place. Of course, the lead involves other structure not described here for simplicity. Also, this is merely one example of many lead structures which include silicone tubing or the like.

Unfortunately, silicone rubber has a tacky surface, which causes excessive friction, making placement of a core wire in such small diameter tubing difficult from the production standpoint in the first place. The ease of placing a core wire or the like in such tubing is referred to as "stringability". In the second place, these friction characteristics also make torque transfer through the tubing difficult thus, for example, making difficult the turning of the core wire which is preferably a torsion coil in the aforementioned "screw in" pacing lead to screw the helical electrode into tissue. Thirdly, due to sticking of the core wire to the inside of the tubing, flex life is shortened.

Previous practices to ameliorate these friction characteristics have involved; 1) the use of harder materials which are more slippery but less biostable and less suitable for implantation e.g., Polyurethane, 2) coating, 3) hardening, 4) swelling and, even 5) the use of environmentally unfriendly materials such as chlorofluorocarbons (CFC). Also, plasma discharge has been used on tubing with some degree of success in this effort. However, none of these practices have been satisfactory with respect to long lengths of tubing and the provision of a uniform surface therein or with respect to successfully modifying the relatively small ID polymer tubing with which this invention is most particularly concerned i.e., less than 1 mm ID.

More specifically, it is known in the art of plasma discharge that exposure of polymeric surfaces to such discharge is effective in modifying the surface to improve its slip characteristics. It is also known to apply this phenomena to plastic polymeric tubing. U.S. Pat. No. 5,133,422 is directed to improving the slip characteristics of such tubing on its OD. U.S. Pat. No. 4,692,347 is directed to plasma deposition of coatings and to improving blood compatibility on both the OD and the ID surfaces of polymeric tubing by coating it under discharge conditions in a single chamber. Primarily, this technique is successful with tubing of about 3 mm to 6 mm in diameter (more specifically tubing with a length to diameter ratio of 100 or less) but it is not effective with relatively small tubing such as tubing less than 1 mm ID, either for discharge in an inert gas e.g., $N_2$, which is a non-film forming gas and no coating, and provides just surface modification of slip characteristics, or for discharge in an inert gas of the film forming or coating type. Film forming gasses are generally a volatile monomer such as methane or any hydrocarbon gas or siloxane vapor or the like which modify surface chemistry even more by forming a coating. However, to date, the literature has not provided examples of plasma discharge treatment of the ID of extremely small tubing, e.g., less than 1 mm ID with either type of gas.

The theory and practice of radio frequency (RF) gas discharge is explained in detail in 1) "Gas-Discharge Techniques For Biomaterial Modifications" by Gombatz and Hoffman, *CRC Critical Reviews in Biocompatibility*, Vol. 4, Issue 1 (1987) pp 1–42; 2) "Surface Modification and Evaluation of Some Commonly Used Catheter Materials I Surface Properties" by Trials and Andrade, *Journal of Biomedical Materials Research.*, Vol. 17, 129–147 (1983), and 3) "Surface Modification and Evaluation of Some Commonly Used Catheter Materials, II. Friction Characterized" also by Trials and Andrade, *Journal of Biomedical Materials Research*, Vol. 17, 149–165 (1983). All of the foregoing is incorporated herein by reference. For purposes of this invention, the gas discharge process or radio frequency discharge as contemplated herein need only be such as to give rise to a plasma glow discharge which interacts with surfaces exposed thereto, such as silicone rubber, to alter same by reaction therewith.

A number of patents have been reviewed in which plasma reactors are disclosed and which can, to a degree, generate some plasma within small diameter tubing. However, the smallest inside diameter that these reactors have been able to generate a slow discharge within is about 3–4 mm (0.118–0.158 inches). Most of these methods depend on gas flow through the ends of the tubing and controlled pressures within the tubing. Some create the plasma outside and cause it to flow into the ends of the tubing (U.S. Pat. Nos. 5,244,654 and 4,752,426). All of them use continuous wave energy (RF or microwave) to excite the plasma.

| LIST OF U.S. PATENTS | | |
|---|---|---|
| U.S. Pat. No. 5,244,654 | 09/14/1993 | Narayanan |
| U.S. Pat. No. 5,223,308 | 06/29/1993 | Doehler |
| U.S. Pat. No. 5,133,986 | 07/28/1992 | Blum et al. |
| U.S. Pat. No. 4,948,628 | 08/14/1990 | Montgomery et al. |
| U.S. Pat. No. 4,927,676 | 05/22/1990 | Williams et al. |
| U.S. Pat. No. 4,846,101 | 07/11/1989 | Montgomery et al. |
| U.S. Pat. No. 4,752,426 | 06/21/1988 | Cho |
| U.S. Pat. No. 4,718,907 | 01/12/1988 | Karwoski et al. |
| U.S. Pat. No. 4,692,347 | 09/08/1987 | Yasuda |
| U.S. Pat. No. 4,448,954 | 12/18/1984 | Hatada et al. |
| U.S. Pat. No. 4,261,806 | 04/14/1981 | Asai et al. |

Some of the patents (U.S. Pat. Nos. 4,752,426 and 4,261,806) cite heat build-up and thermal degradation of the tubing as a problem to be overcome. To prevent tubing over heating, one of the patents (U.S. Pat. No. 4,261,806) transports the tubing through an oil bath, which has obvious disadvantages.

It is a primary object of this invention to provide polymeric tubing which exhibits much improved slip characteristics. This and other objects will be clear from the following description.

SUMMARY OF THE INVENTION

It has been discovered according to this invention that glow discharge can be made to preferentially occur within flexible polymeric tubing of relatively small ID as opposed to outside it if the tube is placed within a close fitting glass reactor or other glow discharge chamber means (preferably thick walled glass or a suitable ceramic, or a dielectric polymer having a close fitting bore) which receives the tubing longitudinally and the glow discharge electrodes are applied to the glass reactor or discharge chamber with the plasma discharge gas being inside the tube. The method is also applicable to larger ID tubing as well. Generally, any nonconductive dielectric reactor chamber means which holds a vacuum will suffice as a discharge chamber. By "close fitting" this term is meant to describe the situation in which any space between the glass reactor or other chamber means and the OD of the polymer tube therein is so small relative to the space within the polymer tube as to discourage discharge in the exterior space, favoring discharge only within the polymer tube. This is applicable to both the non-film forming gases and the film-forming gases. It can also be applied to relatively large tubing to provide a uniformly modified surface. Therefore, in one broad sense the invention provides preferential discharge inside tubing without discharge on its outside and in another sense it provides such discharge in very small tubing. This invention is applicable to multi-lumen tubing also.

The absolute size of the space relationship between the OD of the polymer tube and the ID of the glass bore or other chamber in any given instance will depend on many variables e.g., gas pressure, power applied, relative size of space in holder and ID of tube and so forth.

For example, in small diameter silicone tubing (small diameter being anything less than about 1 mm), such as tubing having an ID of about 0.026 inches to 0.10 inches and an OD of about 0.034 inches to about 0.054 inches, the following treatment conditions have provided tubing with a desirable inner surface with respect to its improved slippery characteristics-clearance space 0.003–0.005", ID of glass holder 0.059", OD of silicone tubing 0.054", pulsed RF power between 300 watts and 80 watts, at 1 millisecond and 5 millisecond, respectively, and gas pressure in the tube of about 0.6 torr $N_2$. The use of pulsed power is a key factor in being able to practice this invention in the case of small diameter tubing without overheating and damaging it.

In any given instance, it can be readily determined empirically by varying discharge conditions and time of exposure to discharge as to what treatment results are obtained and adjusting the conditions to obtain the desired result.

Establishing and maintaining plasma discharge with respect to this invention is otherwise practiced as is known in the art. The plasma discharge apparatus will include a glow discharge chamber or reactor as aforementioned including electric reactor means, the reactor means being adapted for connection to a radio frequency power source or the like for reactance coupling upon application of power from the source, and means for exposing the polymer tubing to a zone in which the glow discharge is created within the polymer tubing while in the reactor chamber upon application of power from the source.

The reactor apparatus of the invention and the method thereof overcomes problems of the designs described in the patent literature as follows:

Tubing Length Limitation: The present apparatus can treat the inside of virtually unlimited lengths of tubing. The only limitation is how large a spool can be fitted inside of the vacuum chamber. A typical reactor will have a capacity of 1,000 to about 5,000 feet depending on tubing diameter. The apparatus of Yasuda U.S. Pat. No. 4,692,347 can coat the lumen of 50 foot lengths of 3.3 mm ID tubing and it is stated that "the length to inside diameter ratio should be in the range of 2 to 100, preferably about 4 to 10. This maximum length is typical of some systems and others can only treat very short two or three foot long sections. In contrast with these systems, tubing can be treated according to the present invention which, for example, has a length to diameter ratio of over 350,000 for a 1,000 foot length. The Yasuda apparatus is limited because its reactor has a space between the substrate tubing and glass reactor tube. This requires that the gas pressure within the substrate be carefully controlled as well as the pressure in the space between substrate lumen and glass. Pressure inside of the substrate can be controlled carefully only when the L/D ratio is small.

The present apparatus is able to overcome the problem of discharge formation between the substrate tubing and glass by a close fit as previously described. This close fit is allowed in a preferred embodiment of the present invention due to substantially by pre-treatment of the substrate tubing's outer surface in an OD plasma treatment zone which reduces the tackiness of the substrate's outer surface to prevent its sticking within a subsequent ID treatment zone glass tube. This feature is most critical in thin walled and very small OD tubing of <0.010"" wall and <0.060" OD.

Overheating of the Tubing: The present invention has treated continuous lengths of tubing with an ID (inside diameter) of 0.026" and can treat tubing as small as 0.010" ID with modified electrodes as is discussed below in detail with reference to FIGS. 7–11. It uses pulsed RF energy in its preferred embodiment which is set at about 150 to 400 watts during the pulse "on" periods. The "on" periods last about 1–3 milliseconds and the off periods last about 4–20 milliseconds. Short pulses of high power interrupted by longer "off" periods provide enough energy to ignite the plasma yet limit its overall intensity and substrate heating effects. This use of pulsed power is critical to the success of the method with tubing having an ID smaller than about 1 mm (0.040"). No reference to the use of pulsed RF energy has been found in the prior art regarding discharges within tubing.

Minimum Inside Diameter of Tubing: The apparatus described in the literature typically treat tubing in the 4 mm (0.158") ID size range. When they are used with tubing in the sub 1 mm ID range the glow discharge (if they can achieve a glow) which is generated is extremely intense and is likely to thermally damage the tubing. One patent (U.S. Pat. No. 5,244,654) describes coating the lumen of tubing with an ID of 0.05 1" but this is done by generating the plasma in a larger chamber and feeding it into the end of a section of small diameter tubing. The plasma only extends a short distance into the tubing so this is obviously not a continuous or practical process. Another patent (U.S. Pat. No. 4,692,347) provides many examples of plasma coatings deposited inside 3.3 mm ID tubing. From experimentation it is known that this system is not capable of generating a plasma in sub 1 mm ID tubing or even sub 2 mm ID tubing.

One of the main problems in very small tubing is that the electrons that are accelerated by the electric field collide with the tubing inner wall without first striking any other gas molecules. These collisions with gas molecules are needed to create the plasma. To achieve a glow inside of very small tubing, a set of special electrodes may be built to include permanent magnets imbedded in the RF electrodes. Also, a powerful electromagnet can be mounted outside of the electrodes. The crossed electric and magnetic fields have the effect of reducing the mean free path of electrons accelerated within the tubing lumen. This is due to the magnetic field's effect on a charged particle moving transverse to the magnetic field. The electron is forced to travel in a helical path (spiral) which makes collisions with neutral molecules more frequent (shorter mean free path). These collisions liberate more electrons and cause breakdown and formation of the plasma.

Treatment of Both Outer and Inner Surfaces: The preferred apparatus and method of the invention utilizes two separate zones in which to first treat the outside of the tubing and then the inside. This is important when treating very small tubing. The small tubing requires a very close fit inside of the ID treatment zone tub to prevent a discharge between tubing and glass as is described in U.S. Pat. No. 4,448,954. This can lead to problems with the tubing sticking inside of the glass tube reactor. However, in the present reactor and method the OD plasma treatment performed on the tubing prior to its entry into the ID zone for treatment reduces the friction between the tubing and reactor which prevents sticking.

Other improved properties resulting from coatings and treatments according to the invention are:

—reduced permeability to fluids and gases;

—reduced "cold flow" of silicone surfaces, and

—provision of specific surface chemistries by selection of functional coatings.

BRIEF DESCRIPTION OF THE FIGURES

FIGS. 7, 8 and 9 are schematic representations of reactors incorporating multi-segment electrodes with 3, 5 and 7 electrode rings, respectively;

FIG. 10 is a schematic representation of a reactor electrode system incorporating an electromagnet; and, FIG. 11 is a schematic representation of a reactor electrode system incorporating permanent magnets in the electrodes, FIG. 11a being a top view of an electrode ring with embedded magnets.

DETAILED DESCRIPTION OF THE INVENTION

Figure 1:
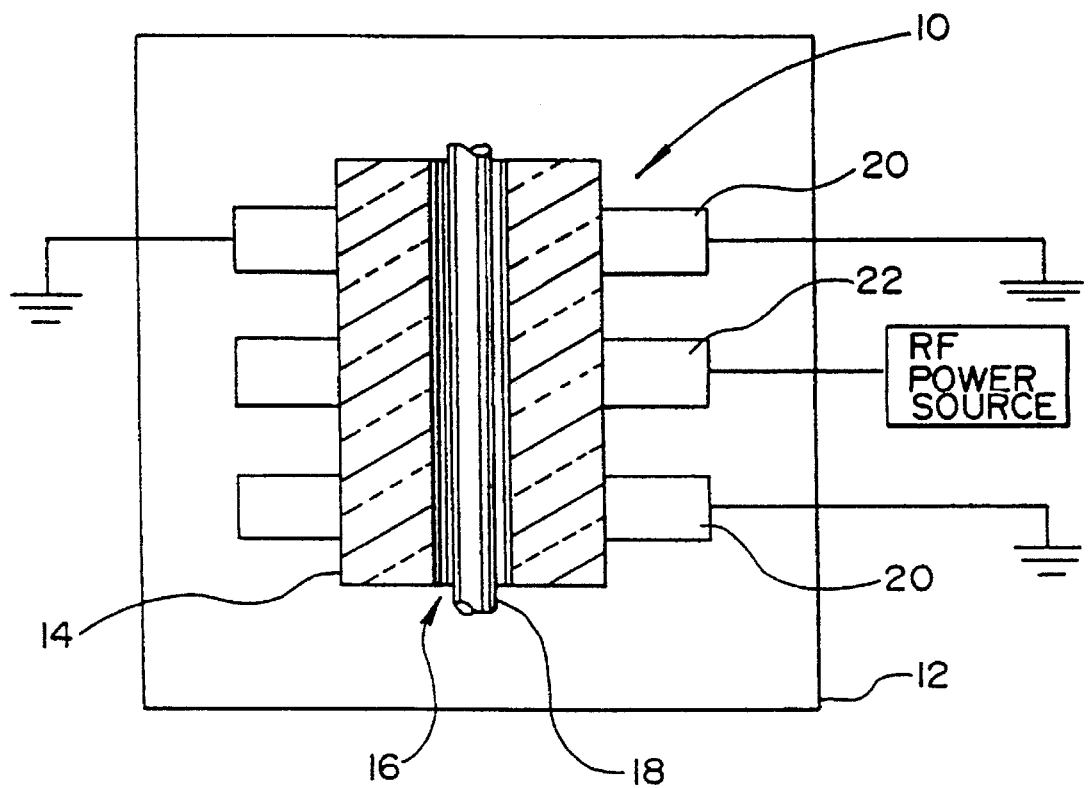
FIG. 1 is a schematic arrangement showing how a piece of polymeric tubing is held in an appropriate glass reactor with minimal clearance according to the invention while being subjected to plasma discharge.

The invention provides in one specific aspect a plasma reactor apparatus and method which produces a glow discharge within the lumen of small diameter silicone tubing for the purpose of crosslinking and hardening the inner surface to, for example, lower the friction with respect to anything to be later inserted into the tubing. The treatment has been demonstrated to uniformly harden the surface by removing methyl groups and causing cross-linking between silicon and oxygen in the plastic. This has been shown by means of IR spectra (FTIR) and electron spectroscopy for chemical analysis (ESCA).

This treatment is preferably performed continuously meaning that tubing is fed from a spool of 1,000+feet of tubing and treated, in one preferred embodiment, as it moves through an outer glow discharge zone and then an inner glow discharge zone of the reactor apparatus after which it passes into a receiving chamber. This inner ID glow discharge or inner treatment zone includes a set of radio frequency electrodes or a microwave cavity. Inside the electrodes is a section of glass tubing serving as a reactor, the tubing having an inside diameter of, for example, approximately 2 to 7% (about 5–7% being most preferred) greater than the outside diameter of the silicone tubing which is being treated within the glass reactor. This is required in order for the glow to be preferentially produced inside of the silicone tubing. When a space of greater than about 0.006 inch or about 7% exists between the silicone and glass reactor, undesired discharge may occur in the space around the outside of the tubing and within the glass reactor rather than preferentially inside of the silicone tubing only. In a separate zone of the apparatus, located just prior to the inner treatment zone i.e., an outer glow discharge zone or outer treatment zone, the outside of the silicone tubing may be glow discharge treated to reduce friction between the OD of the silicone tubing and the inside surface of the glass reactor, which may occur as the silicone tubing passes through the inner treatment zone's small diameter glass reactor. This outer treatment zone may consist of a 0.5 inch or larger glass tube around which is a set of radio frequency electrodes, a coil or a microwave cavity used to excite a glow discharge around the outside of the plastic tubing. In the case of very small tubing, treatment on the outside first can be very important to prevent the tubing from sticking to the close fitting reactor in the ID treatment zone.

All of these glow discharge treatments both inside and outside of the polymeric tubing described above may involve the use of "inert" gases such as helium, neon, argon, or nitrogen. Combinations of the inert gases can also be beneficial to make the initiation of the discharge easier. For example, neon can be added to argon in about 1% concentration to improve plasma initiation. However, residual air contained within the tubing will produce discharge as well since it is primarily nitrogen. Gas pressure in the upper section of the reactor is preferably maintained at a relatively higher pressure than the OD treatment section, although this is not necessary. This fills the plastic tubing with gas to a stable pressure while the OD zone is maintained at a relatively lower pressure which is usually more desirable for the outer surface plasma treatment. Pressure differentials are not critical but can be desirable. These differential pressures are maintained by using gas flow controls, orifices, and automatic exhaust valve pressure controllers (not shown in any detail).

In a variation on the above treatment, a polymerizable siloxane vapor (e.g. hexamethyldisiloxane) has been introduced into the upper chamber of the apparatus. This vapor polymerizes on the outside of the tubing in the outer treatment zone producing a very smooth low friction surface. More importantly, some of the siloxane vapors permeate the tubing wall and pass into the inner treatment zone where they become polymerized as a coating inside of the tubing as well. This means that it is also possible to deposit plasma polymers inside of silicone tubing without feeding the vapors through the end of the tube which would be impractical in long, small diameter tubing. U.S. Pat. No. 4,718,907 and U.S. Pat. No. 4,692,347 reports on systems in which silicone tubing having a length to diameter ratio of less than 100 were coated inside with plasma polymers when vapors were fed into the end of the tube. On the other hand, the length to diameter ratio of the tubing treated according to this subject invention was, for example, 37,500.

In another sense, this invention provides tubing having modified slip characteristics on the inside surfaces thereof particularly small diameter silicone tubing of less than about 1 mm in OD. This is accomplished by means of plasma discharge within the tubing. Improved apparatus for accomplishing this is also provided.

Reference to FIG. 1 schematically shows how this is accomplished according to one embodiment of the invention. Plasma discharge apparatus generally indicated at 10 is enclosed within an evacuated environment 12 which may contain an inert plasma discharge gas such as nitrogen, helium, neon, argon or the like, at a suitable pressure for discharge such as 0.6 torr. Such gases are known to provide, under plasma discharge conditions, cross-linking and hardening of polymer and dielectric surfaces. Preliminary figures for the improvements in slip characteristics indicate that the coefficient of sliding friction between the interior of a silicone tube and metal (e.g. a stainless steel needle) can be reduced by 40–70% by the treatment of the present invention. Herein, these inert gases are referred to as non-film forming gases. Nitrogen is presently preferred for this embodiment.

On the other hand, if it is desired to even more markedly modify the slip characteristics of the surface, a film-forming gas which will polymerize under plasma discharge conditions may be used. Such gases include volatile monomers such as the various hydrocarbons. Siloxane is particularly preferred when working with silicone rubber at the present time. Mixtures of these gases with the non-film forming gases also provide coatings.

Discharge apparatus 10 of FIG. 1 includes a glass reactor and holder 14 having a bore 16 therethrough. A glass capillary tube serves well for this purpose in the case of small polymer tubing. Inside bore 16 is a length of silicone tubing 18 of relatively small ID and OD, as mentioned hereinabove. The bore 16 has an inside diameter of about 2 to 7% greater (not to exceed about 0.006 inch) than the outside diameter of the silicone tubing 18 to be treated. Generally, the bore 16 may be sized about 3 to 5 thousandths of an inch larger than the silicone tubing. As already indicated, close fit and small clearance are required in order to prevent glow discharge from occurring around the outside of the tubing. If this exterior discharge occurs, it extinguishes the discharge inside the tubing which is to receive treatment. The dimensions above are exemplary of effective dimensions which accomplish the end of preferential ID discharge under conditions of suitable pressure, type of gas and size of chamber, etc. However, in any given instance empirical adjustments will determine the relationships necessary to achieve preferential discharge inside the tubing. This unique stratagem enables one to preferentially sustain plasma discharge inside tube 18 with no discharge occurring on the outside of the tubing 18. This has been found to provide uniform surface modification in even small size tubing. Specifically, a reactor apparatus according to the invention has been run with a 0.059 inch ID bore glass capillary tube (0.315 inch OD) for treatment of 0.054 inch OD silicone tubing. For tubing less than about 1.5 mm, such as this 0.054 inch tubing, it is essential if treatment is carried out in apparatus like FIG. 1 on a continuous basis that the OD of the tubing be pre-treated to avoid sticking of the tubing to the glass reactor.

Still referring to FIG. 1, two circular, donut shaped ground electrodes 20 and an RF powered electrode 22 encircle glass reactor 14 as shown. The RF power is preferably operated in a pulse mode. For example, it has been found that pulsing between about 300 watts and about 80 watts for 1–4 milliseconds and 1–10 milliseconds, respectively, produce effective discharge within a relatively small tube such as is shown at 18 without overheating. As already noted, for very small tubing less than 1 mm ID the pulsing is essential.

In an arrangement such as that shown in FIG. 1, if the length of the tubing 18 is greater than the length of the discharge zone between the electrodes 20 and 22, it will be desirable to make provisions to provide discharge throughout the entire length of the tubing. This may be accomplished in a variety of ways. For example, additional sets of electrodes can be distributed over the length of the apparatus. Also, an arrangement may be provided (not shown) in which the set of electrodes move over the length of the apparatus. Most preferably, the arrangement will be modified to allow the tubing 18 to move through the bore 16 as by being pulled therethrough thus passing the tubing through the discharge zone which exists between the electrodes. An embodiment of this latter preferred arrangement is shown schematically in FIG. 2. Continuous tension is preferred to avoid having the polymeric tube stick in the reactor.

Figure 2:
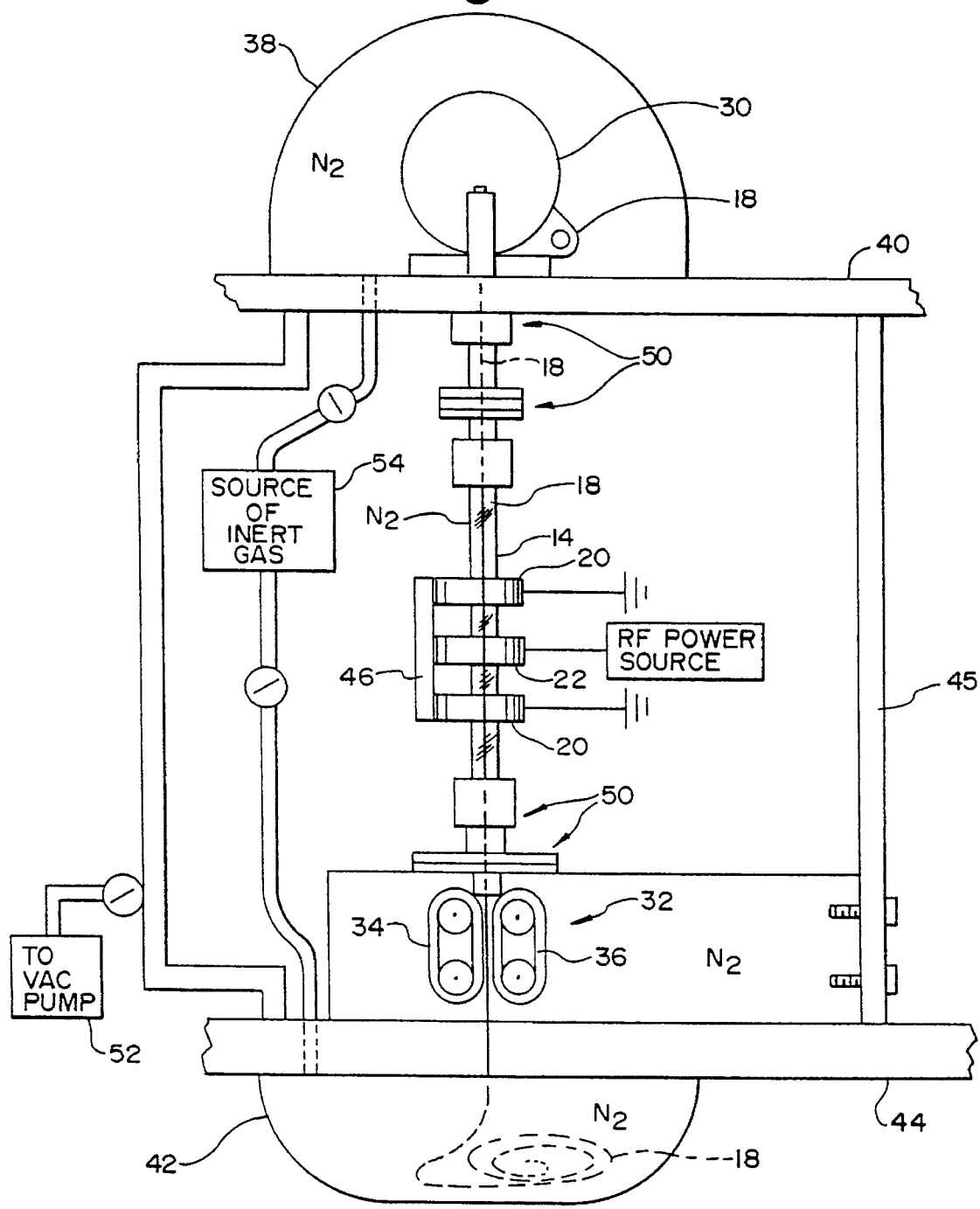
FIG. 2 is a showing of an apparatus according to the invention for plasma discharge treating a coiled length of tubing preferentially on its ID according to the invention on a continuous basis.

The apparatus of FIG. 2 is designed to take advantage of the permeability of silicone rubber for the purpose of conveniently introducing the discharge gas into the inside of the tubing to be treated. In this apparatus a supply of the tubing 18 is held on a reel 30 at the top of the apparatus from which it is pulled by a means such as a tubing transport track drive generally indicated at 32 which is positioned at the bottom of the apparatus. The track drive may include a pair of electrically driven controlled speed drive belts 34 and 36. Other arrangements for pulling the tubing through the apparatus will be apparent to those familiar with this art.

Reel 30 and the supply of tubing it carries are maintained within a sealed environment by means of a bell jar or the like 38 which seals against an upper plate 40. Likewise, the treated tubing which is collected at the bottom of the apparatus is contained within a sealed environment provided by bell jar arrangement 42 which seals against bottom plate 44. Other means for providing sealed chamber arrangements will be readily apparent to those familiar with this art.

In the arrangement of FIG. 2, the primary component is the glass capillary tube reactor 14 through which the silicone tubing 18 passes. ID surface modification is accomplished by the plasma discharge inside the silicone tubing, which occurs in the vicinity of the electrodes 20 and 22 as the tubing passes through the plasma discharge zone (about 1–15 feet/min. is preferred). The electrodes may be held in relative position by means of an insulator spacing holder 46 of PTFE or the like. Of course, the bore within glass capillary tube reactor 14 and the close fit of the plastic tubing therein are arranged in accordance with the discussion hereinabove to create preferential discharge within tubing 18 according to this invention.

In the apparatus, capillary tube 14 is sealingly held to the bottom of upper plate 40 and the top of bottom plate 44 by means of appropriately selected compression fitting and flange arrangements generally indicated at 50, as will be known to those familiar with this art. A side plate means 45 is included to interconnect top and bottom plates 40 and 44 thus rigidly fixing the compression fittings 50 together.

The gas environment is provided by evacuating bell jars 38 and 42 by means of a vacuum pump connected to outlet arrangement 52. Since capillary tube 14 is in sealed communication with both 38 and 42 the entire systems is evacuated in this manner. Other chamber designs may be used. The selected discharge gas, such as nitrogen ($N_2$) in this instance, is introduced to the system through inlet arrangement 54 to a pressure such as 0.6 Torr.

Due to the permeability of silicone rubber, tubing 18 absorbs gas as it remains on reel 30 in bell 38, the gas equilibrating within the tubing ID usually within an hour or so to fill the tubing so that, as the tubing passes through capillary tube 14, it carries the discharge gas with it into the discharge zone between the electrodes. If using tubing other than silicone, such other tubing not being as readily permeable, a standing time of a few hours allows the atmosphere of the chamber to permeate and/or to enter the tubing through its ends and equilibrate. Upon establishment of pulsed RF power such as that described with reference to FIG. 1, preferential discharge occurs within tubing 18 between the electrodes as the tubing passes from reel 30 to bell 42 for collection. In this manner surface modification of the slip characteristics of the ID of tubing 18 is effected, whether merely by hardening or by coating, as desired and depending on the type of gas used.

Due to the tacky nature of silicone rubber, an apparatus such as that shown in FIG. 2 may experience difficulty with the tubing 18 sticking in capillary tube reactor 14 as the tubing is pulled therethrough. Consequently, it is most preferred particularly in the case of small ID tubing, that the OD of the tubing be plasma discharge treated before the ID is treated so as to enhance the slip characteristics of the tubing OD and facilitate passage of the tubing through capillary reactor 14 for discharge treatment of the tubing ID. A preferred apparatus for this aspect of the invention is discussed in connection with subsequent FIGS. 3–6. The apparatus includes three zones—an OD treatment zone 60, a transition zone 82 and an ID treatment zone 66 as are identified in FIG. 3.

Figure 3:
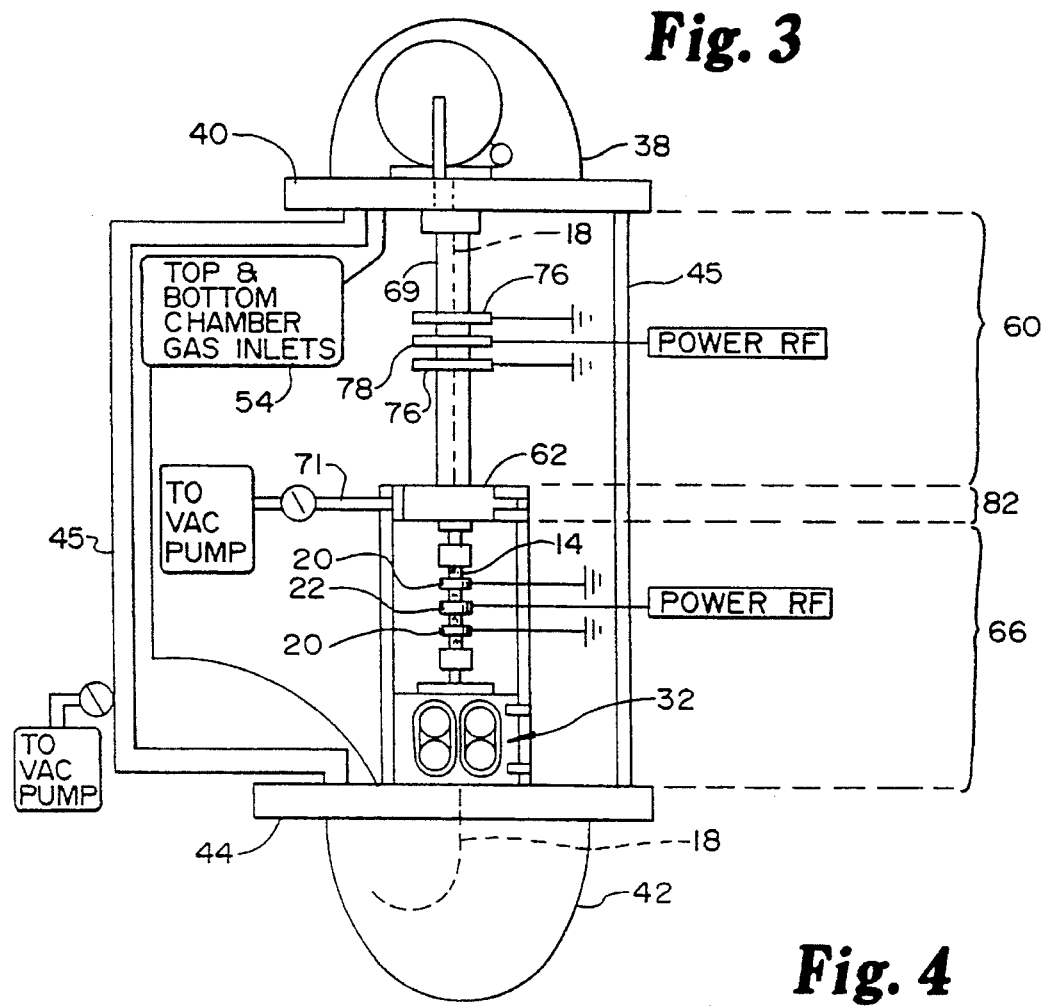
FIG. 3 is a showing of an apparatus similar to that of FIG. 2 but modified to additionally plasma discharge the OD of the tubing prior to its ID treatment.

Referring now to FIG. 3, the OD (outside diameter) zone 60 is the first plasma that the tubing 18 passes through after coming off of reel 30. The top of this section of the apparatus seals against the underside of the top plate assembly 40 as in FIG. 2. The bottom of this section seals against the "transition zone" block 62. In the OD zone 60 the tubing 18 receives a plasma treatment on its outer surface. The treatment is desired in order to reduce surface tackiness of the silicone tubing 18 for handling in the ID zone of the lower portion of the apparatus. This facilitates the tubing passage through a small diameter glass capillary tube 14 in the ID treatment Zone 66 without sticking to the glass.

Figure 4:
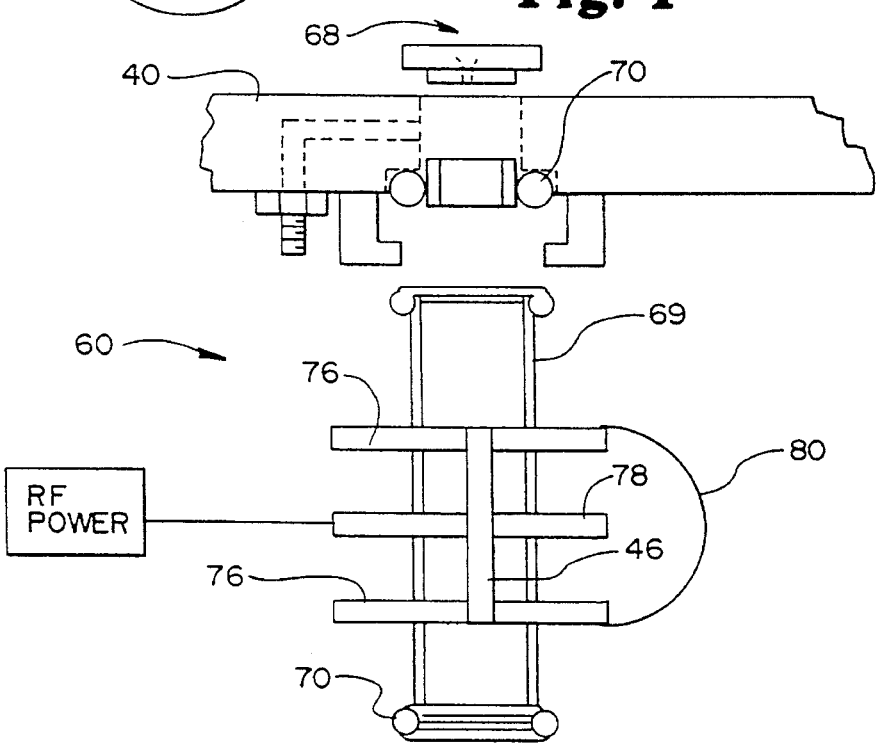
FIG. 4 is a detailed showing of the OD treatment zone of the apparatus of FIG. 3.

Upon entry into OD zone 60, the tubing may pass through a PTFE orifice 68, best seen in FIG. 4, which generally should have a diameter equal to the tubing nominal OD plus 0.001 in ±0.001 in. This diameter may vary depending on the type of tubing and type of treatment or coating to be performed. For tubing 0.054" OD the orifice should be drilled to about 0.055". This size may later be adjusted to achieve precise pressure differentials. The orifice serves to a) prevent the glow discharge from spreading into the upper tubing reel chamber, b) allow different pressures or types of gasses to be maintained in the upper chamber 38 and OD zone 60, c) guide the tubing 18 down the center of the OD zone 60, and d) allow a small gas flow from the upper chamber 38 to the OD zone tube 69 below where a vacuum exhaust line 71 may be arranged to carry away the flow.

The OD zone 60 may consist of a section of glass tubing 69 which is commonly available such as 1.5 inch diameter, sanitary glass tubing. The length of the OD tube 69 may typically be between 6 and 18 inches in length. The glass tube 69 should be capable of forming a vacuum seal with each end of the tube butting up against a O-ring 70, see FIG. 4. Provision is ;made to allow for entry of gases below the orifice 68 and above the end of the glass OD tube section 69.

The reason for the OD of the glass 69 being preferably about 1.5 inches is that in a smaller tube such as 0.5" inches the silicone tubing must be substantially centered in order to maintain a uniform glow discharge at lower gas pressures. The larger tube tolerates more misalignment and maintains a uniform discharge around the tubing.

The circular disc or donut shaped electrodes 76 and 78 are dimensioned to suit the diameter and length of the OD tube 69. A PTFE insulator support bar 46 may be included as shown in FIG. 4. The two ground electrodes 76 may be connected by a common ground strap 80 also as shown in FIG. 4.

Figure 5:
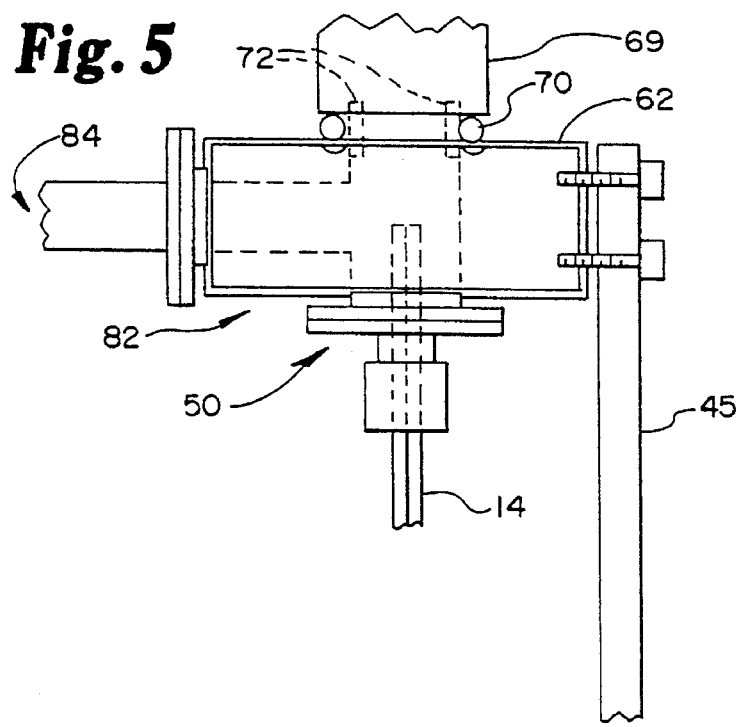
FIG. 5 is a detailed showing of the transition zone between the OD and ID treatment zones of the apparatus of FIG. 3.

Transition Zone, zone 82—see FIG. 5 in particular, serves as a connection between the OD and ID treatment zones 60 and 66, respectively. It must a) be capable of forming a vacuum seal with the lower end to the OD treatment glass tube 69, b) connect with the compression fitting 50 of the ID treatment zone 66 below it—see FIG. 5, c) provide a vacuum port 84 which connects to an automatic throttle valve pressure controller (this allows gas flow which enters through or below the orifice 68 at the top of the OD zone 60 to be drawn off below the OD zone), and d) provide a rigid connection to the lower end of the ID treatment zone 66 in order to minimize or prevent any relative motion between the top and bottom compression fittings 50 of the ID treatment zone 66.

Figure 6:
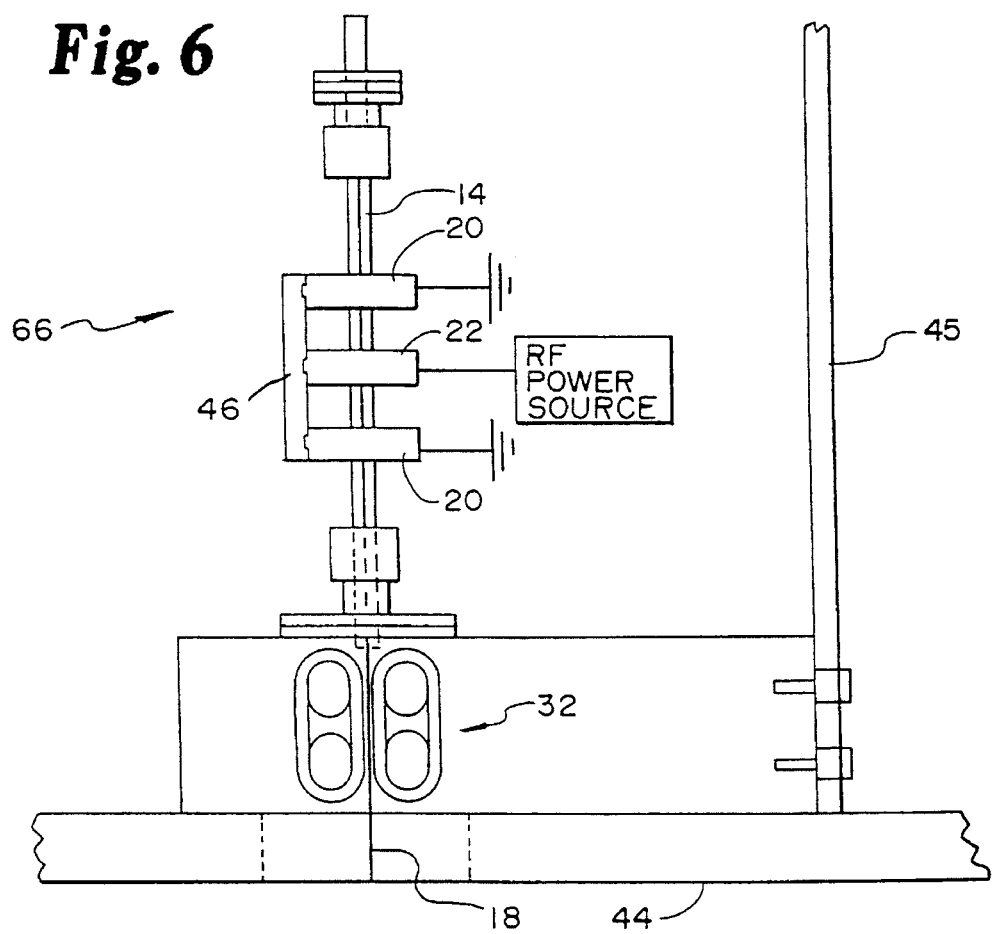
FIG. 6 is a detailed showing of the ID treatment zone of the apparatus of FIG. 3.

The Inside Diameter Treatment Zone, zone 66—see FIG. 6 in particular, performs the glow discharge treatment of the inside of the tubing 18 as it moves through the zone, similar to that shown in FIG. 2. The primary component is the glass capillary tubing 14 through Which the silicone tubing passes. The slip treatment on the tubing outer surface which is performed in the OD glow discharge zone 60 prior to entry into the glass capillary tube is recommended to prevent the silicone tubing from sticking to the glass. The tubing must pass through the glass capillary without binding for ease of handling.

The glass capillary reactor 14 or equivalent is a critical component. The small bore in the glass is sized approximately 2 to 7% larger than the silicone tubing that will be treated. The small clearance is required in order to prevent glow discharge from occurring around the outside of the silicone tubing as already stated.

Length of the capillary 14 should generally be as short as possible about 3" of exposed glass between compression fittings is the practical minimum with the apparatus shown to still allow the donut shaped electrodes 20 and 22, (3 capacitive rings) enough room. If multiple (more than 3) capacitive electrode rings are used, a length of 4–6 inches may be required. Also, if a helical resonator plasma excitation (13.56 Mhz) source is used, a tube length of close to 10 inches may be required.

Electrode configuration may vary. However, this will have little effect on the design of the mechanical components of the apparatus. If 3, 5, or 7 capacitive ring electrodes are used, the only design change between them will be an adjustment of the length of the capillary tube 14. For present purposes three sets of silver plated brass electrodes are being used successfully. If a helical resonator source (not shown) is used instead of capacitive electrodes, sufficient space must be reserved around the capillary tube. This source may be positioned co-axially around the capillary tube and may have a cylindrical shape incorporating an RF resonant coil and cavity with a diameter of about 5 inches and a length of 6–10 inches.

Various electrode configurations can be used. They all provide the best performance when pulsed RF power is used. As can be seen in FIGS. 7–9, segmented electrodes consisting of 3, 5, 7 or more cylindrical segments may be used to act in combination to concentrate the electric field inside of the tubing lumen.

A reactor apparatus according to this invention can readily achieve low pressure discharge within very small diameter and multi-lumen tubing by using magnetically enhanced electrode(s). Examples of such enhanced electrode assemblies are shown in FIGS. 10, 11 and 11a utilizing electromagnets 100 and permanent magnets 102 respectively, FIG. 11a representing a top view of an electrode ring 20 or 22 from FIG. 11 with embedded magnets 102. All of these aspects of the invention are akin to magnetic confinement of the plasma with the tubing lumen.

It can be seen from the foregoing specifications that the invention in its most preferred form presently comprises a plasma reactor and method which produces a glow discharge within the lumen of small diameter silicone tubing for the purpose cross-linking and hardening the inner surface. This treatment is performed continuously meaning that tubing is fed from a spool of 1000+feet of tubing and treated as it moves through an outer glow discharge zone and then an inner glow discharge zone of the reactor then it passes into a receiving chamber. The inner glow discharge zone is a set of radio frequency electrodes through which passes a section of glass tubing having an inside diameter of approximately 2–7% greater than the outside diameter of the silicone tubing which is being treated. This is required in order for the glow to be produced inside of the silicone tubing. When a space of greater than about 7% exists between the silicone and glass undesired discharge may occur in this space rather than inside of the tube. In a separate zone of the reactor, located just prior to the inner treatment zone, the outside of the tubing is glow discharge treated to reduce friction which will occur as the tubing passes through the inner treatment zone's small diameter glass tube. This zone consists of a 0.5 inch or larger glass tube around which is a set of radio frequency electrodes or a microwave cavity used to excite a glow discharge around the outside of the tubing. Various electrode configurations may be used but they all provide the best performance when pulsed RF power is used. Magnetic fields can be used to enhance the discharges and allow lower pressure operation and treatment of multi-lumen tubing.

All of these glow discharge treatments both inside and outside of the tubing described above may involve the use of "inert" gases such as helium, neon, argon, or nitrogen or film forming gases as previously described or residual gas. Gas pressure in the upper and lower sections of the reactor are preferably maintained at a relatively higher pressure than the OD treatment zone. This fills the tubing with inert gas to a stable pressure while the OD zone is maintained at a relatively lower pressure which is more desirable for the outer surface plasma treatment. These differential pressures are maintained by using gas flow controls, orifices, and automatic exhaust valve pressure controllers as will be known by those familiar with this art.

In a variation on the above treatment, a polymerizable siloxane vapor, or other polymerizable gas e.g., silane or fluorocarbon may be introduced into the upper chamber. Such vapor polymerizes on the outside of the tubing in the outer treatment zone producing a very smooth low friction surface. More importantly, siloxane vapors permeate the tubing wall and pass into the inner treatment zone where they became polymerized as a coating inside of the tubing. This means that it is also possible to deposit plasma polymers inside of silicone tubing without feeding the vapors through the end of the tube which would be impractical in long, small diameter tubing.

The possible uses of this invention include any tubular device which has a moving part in contact with the ID of silicone rubber tubing or any polymer which exhibits a tacky surface, particularly those devices in which the contact occurs within the lumen of silicone tubing.

An important advantage of treated tubing is the improved "stringability" it offers for inserting wire torsion coils, braided wire and the like into the tubing through the lumen thereof. This is an important advantage in cases such as pacing leads for example where small wires must be threaded or pushed through the lumen over distances of two to four feet, typically.

Heretofore, "stringability" has been accomplished by treating the tubing with an agent such as Freon to swell it and using isopropyl alcohol to wet the wire and lumen while pushing the wire into the lumen. All of this is now obviated by the fact that tubing treated according to this invention will readily accept insertion of a wire or the like without any other treatment step by merely pushing the wire into the lumen. This is due to the increased and improved slip characteristics imparted to the tubing ID by the treatment of this invention.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached thereto.

What is claimed is as follows:

1. A method for modifying slip characteristics of a surface of an elongated passageway in polymeric tubing comprising:

passing the tubing of a dielectric plastic material containing in the passageway thereof a discharge gas at low pressure through a glow discharge zone in a reactor chamber:

accomplishing a glow discharge, the glow discharge being produced in the gas in the passageway by reactance coupling utilizing power provided by a radio frequency power source wherein the power source is pulsed on and off in a continuous sequence to sustain the glow discharge, the reactor chamber having an inside diameter in a close fitting relative to an outside diameter of the tubing such that the glow discharge occurs only within the passageway of the tubing, and maintaining a reduced pressure within the reactor chamber to establish and maintain glow discharge conditions within the passageway.

2. The method of claim 1 wherein the inside diameter of the reactor chamber is about 2 to 7% greater than the outside diameter of the tubing.

3. The method of claim 1 further comprising subjecting the outside diameter of the tubing to discharge treatment prior to passing the tubing through the glow discharge zone.

4. The method of claim 1 wherein the discharge gas is residual air in the tubing.

5. The method of claim 1 wherein the discharge gas is of a non-film forming gas.

6. The method of claim 1 wherein the discharge gas is of a film forming gas.

7. The method of claim 1 wherein the gas includes a quantity of polymerizable vapor.

8. The method of claim 1 wherein the passageway has a diameter of less than about 1 millimeter.

9. A method for modifying slip characteristics of a surface of an elongated passageway in polymeric tubing comprising:

passing the tubing of a dielectric plastic material containing in the passageway thereof a discharge gas at low pressure through a glow discharge zone in a reactor chamber;

accomplishing a glow discharge, the glow discharge being produced in the gas in the passageway by reactance coupling utilizing power provided by a pulsed radio frequency power source providing a continuous sequence of "on" periods and "off" periods, the "on" periods having a duration of about 1 to 3 milliseconds and the "off" periods having a duration of about 4 to 20 milliseconds, the reactor chamber having an inside diameter in a close fitting relative to an outside diameter of the tubing such that the glow discharge occurs only within the passageway of the tubing, and maintaining a reduced pressure within the reactor chamber to establish and maintain glow discharge conditions within the passageway.

10. The method of claim 9 wherein the power applied during the pulse "on" periods is about 150 to 400 watts.

11. The method of claim 9 wherein the inside diameter of the reactor chamber is about 2 to 7% greater than the outside diameter of the tubing.

12. The method of claim 9 further comprising subjecting the outside diameter of the tubing to discharge treatment prior to passing the tubing through the glow discharge zone.

13. The method of claim 9 wherein the discharge gas is residual air in the tubing.

14. The method of claim 9 wherein the discharge gas is of a nonfilm forming gas.

15. A method of claim 9 wherein the discharge gas is of a film forming gas.

16. The method of claim 9 wherein the gas includes a quantity of polymerizable vapor.

17. The method of claim 9 wherein the passageway has a diameter of less than about 1 millimeter.

18. A method for modifying slip characteristics of a surface of an elongated passageway in polymeric tubing comprising:

introducing a gas into a reaction chamber;

passing the polymeric tubing through a first radio frequency glow discharge zone in the reactor chamber;

accomplishing a first glow discharge, the first glow discharge being produced in the gas only on an outside diameter of the tubing such that tackiness of an outside cylindrical surface of the tubing is reduced;

passing the tubing containing in the passageway thereof a discharge gas at low pressure through a second glow discharge zone in the reactor chamber;

accomplishing a second glow discharge, the second glow discharge being produced in the gas in the passageway by reactance coupling utilizing power provided by a radio frequency power source wherein the power source is pulsed on and off in a continuous sequence to sustain the glow discharge, the reactor chamber having an inside diameter in a close fitting relative to the outside diameter of the tubing such that the glow discharge occurs only within the passageway of the tubing, and maintaining a reduced pressure within the reactor chamber to establish and maintain glow discharge conditions within the passageway.

19. The method of claim 18 wherein the power source is pulsed.

20. The method of claim 18 wherein the inside diameter of the reactor chamber is about 2 to 7% greater than the outside diameter of the tubing.

21. The method of claim 18 wherein the discharge gas is residual air in the tubing.

22. The method of claim 18 wherein the discharge gas is of a nonfilm forming gas.

23. The method of claim 18 wherein the discharge gas is of a film forming gas.

24. The method of claim 18 wherein the gas includes a quantity of polymerizable vapor.

25. The method of claim 18 wherein the passageway has a diameter of less than about 1 millimeter.

26. A method for modifying slip characteristics of a surface of an elongated passageway in polymeric tubing comprising:

diffusing a discharge gas through a cylindrical wall of the polymeric tubing to the passageway of the polymeric tubing;

passing the tubing of a dielectric plastic material containing in the passageway thereof the discharge gas at low pressure through a glow discharge zone in a reactor chamber;

accomplishing a glow discharge, the glow discharge being produced in the gas in the passageway by reactance coupling utilizing power provided by a radio frequency power source wherein the power source is pulsed on and off in a continuous sequence to sustain the glow discharge, the reactor chamber having an inside diameter relative to an outside diameter of the tubing such that it is close fitting relative thereto and the glow discharge occurs only within the passageway of the tubing, and maintaining a reduced pressure within the reactor chamber to establish and maintain glow discharge conditions within the passageway.

27. The method of claim 26 wherein the power source is pulsed.

28. The method of claim 26 wherein the inside diameter of the reactor chamber is about 2 to 7% greater than the outside diameter of the tubing.

29. The method of claim 26 further comprising subjecting the outside diameter of the tubing to discharge treatment prior to passing the tubing through the glow discharge zone.

30. The method of claim 26 wherein the discharge gas is of a nonfilm forming gas.

31. The method of claim 26 wherein the discharge gas is of a film forming gas.

32. The method of claim 26 wherein the discharge gas includes a quantity of polymerizable vapor which also diffuses through the walls of the tubing.

33. The method of claim 32 wherein the polymerizable vapor is a siloxane.

34. The method of claim 26 wherein the passageway has a diameter of less than about 1 millimeter.

* * * * *

UNITED STATES PATENT AND TRADEMARK OFFICE
CERTIFICATE OF CORRECTION

PATENT NO. : 5,593,550
DATED : Jan. 14, 1997
INVENTOR(S) : Mark T. Stewart et al.

It is certified that error appears in the above-indentified patent and that said Letters Patent is hereby corrected as shown below:

C. 1 L.9    "such a" to be changed to "such as"
C. 1 L.19   "may" to be changed to "many"

C. 4 L. 33  *<0.010""* to be changed to *<0.010"*
C. 4 L. 57  *0.05 1"* to be changed to *0.051"*
C. 10 L. 16 *;made* to be changed to *made*
C. 10 L. 49 *Which* to be changed to *which*
C. 12 L. 58 *chamber:* to be changed to *chamber;*

Signed and Sealed this

Sixteenth Day of November, 1999

Attest:

Q. TODD DICKINSON

*Attesting Officer*    *Acting Commissioner of Patents and Trademarks*